US010562366B2

(12) United States Patent
Seitz et al.

(10) Patent No.: US 10,562,366 B2
(45) Date of Patent: Feb. 18, 2020

(54) BATTERY COOLING DEVICE AND ASSOCIATED OPERATING METHOD

(71) Applicant: Mahle Behr GmbH & Co. KG, Stuttgart (DE)

(72) Inventors: Matthias Seitz, Oberkochen (DE); Herbert Hofmann, Stuttgart (DE); Stefan Hirsch, Stuttgart (DE); Caroline Janzen, Stuttgart (DE)

(73) Assignee: Mahle Behr GmbH & Co. KG (DE)

( * ) Notice: Subject to any disclaimer, the term of this patent is extended or adjusted under 35 U.S.C. 154(b) by 450 days.

(21) Appl. No.: 14/681,056

(22) Filed: Apr. 7, 2015

(65) Prior Publication Data
US 2015/0283874 A1 Oct. 8, 2015

(30) Foreign Application Priority Data

Apr. 8, 2014 (DE) .................. 10 2014 206 770

(51) Int. Cl.
*B60H 1/00* (2006.01)
(52) U.S. Cl.
CPC ..... *B60H 1/00278* (2013.01); *B60H 1/00392* (2013.01)
(58) Field of Classification Search
CPC ............ B60H 1/00271; B60H 1/00278; B60H 1/00392; B60H 2001/00307;
(Continued)

(56) References Cited

U.S. PATENT DOCUMENTS 1,386,579 A * 8/1921 Maranville ............... B64B 1/64
137/336
3,291,153 A * 12/1966 Chabrier ................. B06B 1/183
137/102
(Continued)

FOREIGN PATENT DOCUMENTS

DE 102011113242 A1 3/2012
DE 102012005871 A1 9/2013
(Continued)

OTHER PUBLICATIONS

English abstract for DE-102011113242.
English abstract for DE-102012005871.
German Search Report for DE-102014206770.7, dated Nov. 4, 2014.

*Primary Examiner* — Elizabeth J Martin
*Assistant Examiner* — Melodee Jefferson
(74) *Attorney, Agent, or Firm* — Fishman Stewart PLLC

(57) ABSTRACT

A battery cooling device may include a refrigeration circuit configured to communicate a refrigerant in a flow direction. The refrigeration circuit may include a plurality of refrigerant paths configured to be flowed through in parallel by the refrigerant along the flow direction. The plurality of refrigerant paths may respectively include at least one of a cooling element and a cooling element section. The at least one of the cooling element and the cooling element section may be fluidically incorporated into the respective refrigerant paths and be thermally coupled in a heat-transmitting manner to at least one battery. A plurality of valve devices may be arranged in the respective refrigerant paths and be configured to control a throughflow of the refrigerant.

20 Claims, 3 Drawing Sheets

(58) Field of Classification Search
CPC ............. H01M 10/613; H01M 10/625; H01M 2/1077; H01M 10/6555; H01M 10/653; H01M 2220/20
See application file for complete search history.

(56) References Cited

U.S. PATENT DOCUMENTS

| | | | | |
|---|---|---|---|---|
| 5,756,227 A * | 5/1998 | Suzuki | ............... | F28F 3/02 429/120 |
| 6,182,742 B1 * | 2/2001 | Takahashi | ......... | H05K 7/20281 165/104.33 |
| 6,481,230 B2 * | 11/2002 | Kimishima | ............ | B60H 1/323 62/238.7 |
| 7,658,083 B2 * | 2/2010 | Zhu | ................... | B60H 1/00278 62/243 |
| 7,823,671 B2 * | 11/2010 | Inoue | .................... | B60K 11/02 180/68.1 |
| 7,968,223 B2 * | 6/2011 | Lee | ..................... | H01M 2/1077 429/120 |
| 8,231,996 B2 * | 7/2012 | Howard | ............. | F28D 15/0233 429/120 |
| 8,505,322 B2 * | 8/2013 | Gielda | ...................... | F25B 1/06 429/120 |
| 8,527,095 B2 * | 9/2013 | Kikuchi | ............. | B60H 1/00278 165/121 |
| 8,955,345 B2 * | 2/2015 | Meitinger | .......... | B60H 1/00271 62/239 |
| 9,163,887 B2 * | 10/2015 | Katayama | ................. | F28F 9/00 |
| 9,291,405 B2 * | 3/2016 | Pentapati | ................. | F28F 3/12 |
| 2002/0184908 A1 | 12/2002 | Brotz | ....................... | B60H 1/00 62/259.2 |
| 2007/0157647 A1 * | 7/2007 | Duhme | ............. | B60H 1/00278 62/196.4 |
| 2008/0292948 A1 * | 11/2008 | Kumar | ................ | H01M 2/1077 429/120 |
| 2009/0000329 A1 * | 1/2009 | Colberg | ................. | B64D 13/00 62/335 |
| 2009/0142628 A1 * | 6/2009 | Okada | ................. | H01M 2/0237 429/8 |
| 2009/0255109 A1 * | 10/2009 | Weber | ..................... | H01M 2/14 29/623.2 |
| 2010/0154445 A1 * | 6/2010 | Sullivan | ............. | B60H 1/00414 62/115 |
| 2010/0307723 A1 * | 12/2010 | Thomas | ............. | B60H 1/00278 165/104.33 |
| 2011/0139397 A1 * | 6/2011 | Haussmann | ....... | B60H 1/00278 165/43 |
| 2011/0174004 A1 * | 7/2011 | Heckenberger | .... | B60H 1/00278 62/222 |
| 2011/0206967 A1 * | 8/2011 | Itsuki | ....................... | B60K 1/04 429/120 |
| 2011/0214838 A1 * | 9/2011 | Akiyama | ........... | B60H 1/00278 165/41 |
| 2012/0078437 A1 * | 3/2012 | Stripf | .................. | H01M 6/5038 700/300 |
| 2012/0085512 A1 * | 4/2012 | Graaf | ................. | B60H 1/00278 165/51 |
| 2012/0097365 A1 * | 4/2012 | Papoulis | .................. | F28D 9/005 165/61 |
| 2012/0101673 A1 * | 4/2012 | Caddick | ................. | B60H 1/004 701/22 |
| 2012/0125032 A1 * | 5/2012 | Graaf | ................. | B60H 1/00278 62/318 |
| 2013/0025311 A1 * | 1/2013 | Graaf | ................. | B60H 1/00271 62/238.7 |
| 2013/0034767 A1 * | 2/2013 | Pentapati | .................. | F28F 3/12 429/120 |
| 2013/0255293 A1 * | 10/2013 | Gadawski | ............... | F25D 19/00 62/121 |
| 2013/0333398 A1 | 12/2013 | Wendrock et al. | | |
| 2014/0216086 A1 * | 8/2014 | Ohno | ................. | B60H 1/00278 62/228.1 |
| 2014/0374081 A1 * | 12/2014 | Kakehashi | ............. | B60K 11/02 165/202 |

FOREIGN PATENT DOCUMENTS

| | | | |
|---|---|---|---|
| DE | 102012210221 A1 | 12/2013 | |
| EP | 2305496 A1 | 4/2011 | |
| JP | WO 2013093991 A1 * | 6/2013 | ............ B60H 1/323 |
| WO | WO-2013/093991 A1 | 6/2013 | |

* cited by examiner

BATTERY COOLING DEVICE AND ASSOCIATED OPERATING METHOD

CROSS-REFERENCE TO RELATED APPLICATIONS

This application claims priority to German Patent Application No. 10 2014 206 770.7, filed Apr. 8, 2014, the contents of which are hereby incorporated by reference in their entirety.

TECHNICAL FIELD

The present invention relates to a battery cooling device, in particular for a vehicle with electric drive. The present invention also relates to a method for cooling batteries, in particular of a vehicle with electric drive.

BACKGROUND

Vehicles with electric drive are for example purely electric vehicles, which have only an electric drive, or hybrid vehicles, which have a further drive in addition to an electric drive. In particular, this also includes vehicles which are equipped with a so-called "range extender". In the case of vehicles of said type, batteries are used for storing electrical energy. The batteries can warm up when current is drawn and during charging. Elevated temperatures however have an adverse effect on the performance of the batteries. Accordingly, battery cooling devices are required in order to dissipate the heat that is generated at the batteries during the operation of the vehicle, for example in order to lengthen the service life of the batteries. If multiple batteries are used in a vehicle, it is also important that the batteries can as far as possible be operated at the same temperature level.

US 2011/0206967 A1 has disclosed a vehicle with electric drive and with a battery cooling device, wherein the battery cooling device is equipped with a refrigeration circuit. The refrigeration circuit comprises, in a closed refrigerant path, a compressor for compressing a refrigerant which circulates in the refrigerant path. Downstream of the compressor there is arranged a condenser for the liquefaction of the compressed refrigerant. Downstream of the condenser there is provided an expansion device for expanding the liquefied refrigerant, with the refrigerant correspondingly cooling down at the same time. Furthermore, in the refrigerant path downstream of the expansion device, there are arranged cooling elements which are coupled in heat-transmitting fashion to batteries. The cooling elements serve, in the refrigeration circuit, as evaporators which evaporate the refrigerant.

DE 10 2012 005 871 A1 has disclosed a plate-shaped cooling element in which there are provided multiple cooling ducts which can be flowed through in parallel by a coolant.

EP 2 305 496 B1 has disclosed a further battery cooling device in which use is likewise made of a plate-shaped cooling element.

SUMMARY

The present invention is concerned with the problem of specifying, for a battery cooling device and for an associated operating method, an improved embodiment which is distinguished in particular by the fact that, even in the case of a relatively large number of batteries, the longest possible service life of the batteries can be attained with the aid of the battery cooling device.

Said problem is solved according to the invention by the subjects of the independent claims. The dependent claims relate to advantageous embodiments.

The invention is based on the general concept of providing, in the refrigeration circuit, multiple refrigerant paths which can be flowed through in parallel by the refrigerant and in each of which there is arranged at least one cooling element or at least one cooling element section, in such a way that the respective cooling element or the respective cooling element section can be flowed through by the refrigerant. In the installed state of the battery cooling device, the cooling elements or the cooling element sections are coupled in heat-transmitting fashion to the batteries to be cooled. The invention furthermore proposes that the refrigerant paths and/or at least one refrigerant path group which comprises multiple refrigerant paths be controlled with regard to a throughflow of refrigerant by means of valve devices. In this case, the respective valve device is arranged in the respective refrigerant path downstream of a branching region, in which the refrigerant paths and/or the respective refrigerant path group branch(es) off from a refrigerant main line of the refrigeration circuit, and upstream of a confluence region, in which the refrigerant paths and/or the respective refrigerant path group are/is connected to the refrigerant main line again. By means of this design, it is possible for the individual refrigerant paths and/or the respective refrigerant path group to be controlled separately or in groups with regard to their throughflow of refrigerant in a particularly simple manner by means of the valve devices. In conjunction with corresponding temperature monitoring, it is thus possible in a particularly simple manner for flow to be conducted through the individual refrigerant paths and/or the respective refrigerant path group in a manner dependent on the respective cooling demand. The design proposed here thus makes it possible for the individual batteries to be protected against overheating, which lengthens the service life thereof.

Specifically in the case of automotive applications, it is often the case that multiple batteries are combined to form a battery block, wherein the individual batteries within a battery block of said type can also be referred to as battery cells. The cooling elements proposed here may then be assigned to a battery block of said type or else to individual batteries or battery cells.

In a particularly advantageous embodiment, no refrigerant path groups are provided, such that all of the refrigerant paths can be controlled individually by means of separate valve devices.

In a simplified embodiment, it is likewise possible for all refrigerant paths to each be assigned a separate valve device, wherein grouping of the refrigerant paths into individually controlled groups is nevertheless possible, for example in order to keep the cooling power as constantly as possible at a high level. In this case, the refrigerant paths of a refrigerant path group of said type are each individually controllable with regard to their throughflow of refrigerant by means of a separate valve device. For example, nine refrigerant paths numbered continuously from 1 to 9 may be provided, which altogether may be divided into three refrigerant path groups. A first refrigerant path group may for example comprise refrigerant paths numbers 1 to 3. A second refrigerant path group may for example comprise refrigerant paths numbers 4 to 6. A third refrigerant path group may for example comprise refrigerant paths numbers 7 to 9. It is thus possible, by synchronized actuation of the associated valve devices, for flow to be conducted through the refrigerant paths of the three refrigerant path groups in succession.

It may alternatively be provided that the refrigerant paths of a refrigerant path group of said type are controllable in groups with regard to their throughflow of refrigerant by means of a common valve device. In the above example, the three refrigerant paths of the respective refrigerant path group are then in each case assigned a common valve device.

In a further alternative, the refrigerant paths of a refrigerant path group of said type may be individually controllable with regard to their throughflow of refrigerant by means of a common valve device. What is conceivable, for example, is a valve device by means of which two or more refrigerant paths can be selectively connected to a common port (inlet or outlet) of the refrigerant path group. In particular, it may be provided that it is always the case that at least one of the refrigerant paths of the refrigerant path group is connected to the common port, while all the other refrigerant paths of said refrigerant path group are then blocked. Accordingly, it is always the case that flow passes through at least one of the refrigerant paths of said refrigerant path group, wherein the respective refrigerant path through which flow passes can be selected by means of the valve device.

In another advantageous embodiment, the respective valve device may be designed as an open-closed valve which can be switched only between an open position and a closed position. Such valve devices can be produced at particularly low cost and exhibit high reliability. For example, an open-closed valve of said type may be in the form of a solenoid valve, the valve element of which is electromagnetically adjustable. A solenoid valve of said type can assume one switching position, for example the closed position, in the de-energized state and can assume the other switching position, for example the open position, in the energized state. With corresponding configuration of the refrigeration circuit, it is thus also possible to realize a failsafe principle, such that the risk of damage to the battery cooling device in the event of an electrical failure is reduced.

In a particularly advantageous embodiment, a control device for actuating the valve devices may be provided, which control device is coupled to the valve devices in a suitable manner, for example by way of electrical lines, and is configured and/or programmed such that, during the operation of the battery cooling device, said control device actuates the valve devices such that the individual refrigerant paths are flowed through temporally in succession by the entire refrigerant flow flowing in the refrigerant main line. This measure ensures that it is always the case that a defined refrigerant flow, that is to say in particular a known volume flow, flows through the individual refrigerant paths. By means of these known parameters, the cooling power of the respective cooling path can be determined with relatively high accuracy. Furthermore, by means of this measure, a so-called "oil trap" within the refrigeration circuit can be eliminated. For lubrication of the compressor that is normally incorporated into the refrigeration circuit, the refrigerant comprises a certain lubricant fraction, wherein the lubricant is generally an oil. Whereas the refrigerant evaporates and condenses within the refrigeration circuit in accordance with the cycle, the lubricant generally remains in liquid form, and can accumulate in a geodetically low-lying refrigerant path. Owing to the fact that all of the refrigerant paths are flowed through in succession by the entire refrigerant flow, all of the refrigerant paths are forcibly scavenged, whereby all accumulations of lubricant can be discharged.

In one advantageous refinement, the control device may be configured and/or programmed such that, during the operation of the battery cooling device, said control device successively actuates in each case only one of the valve devices to open while simultaneously actuating all of the other valve devices to close. A corresponding situation applies in the case of grouping of the refrigerant paths, such that then only the valve device(s) assigned to the respective refrigerant path group are actuated to open, whereas all of the other valve devices are adjusted into the closed position. In this way, it is achieved in a particularly simple manner that the entire refrigerant flow, which also flows in the refrigerant main line, flows through the respective individual open refrigerant path or through the respective refrigerant path group. Thus, the entire cooling power of the refrigeration circuit is available to the respective refrigerant path or to the respective refrigerant path group.

In another refinement, a temperature sensor arrangement may be provided for detecting the temperatures of the batteries assigned to the individual refrigerant paths or refrigerant path groups, which temperature sensor arrangement is coupled to the control device in a suitable manner, for example by way of corresponding electrical lines. The control device may in this case be configured and/or programmed such that, in a manner dependent on the determined temperatures, said control device selects opening times of the valve devices such that the valve device of the respective refrigerant path is actuated to open for longer the higher the temperature of at least one battery assigned to said refrigerant path and/or to said refrigerant path group is, or the higher the average temperature of all of the batteries of said refrigerant path and/or of said refrigerant path group is. In other words, the greater the cooling demand in the respective refrigerant path or in the respective refrigerant path group, the longer said refrigerant path or said refrigerant path group is flowed through by the entire refrigerant flow. In this way, it is possible to achieve cooling of the individual batteries, or of the batteries assigned to the individual refrigerant paths or to the respective refrigerant path group, in accordance with demand.

In one advantageous refinement, the controller may be configured and/or programmed such that, for each refrigerant path and/or for each refrigerant path group, said controller performs separate temperature regulation through variation of the opening times of the associated valve devices. It is thus possible for all of the refrigerant paths and/or refrigerant path groups to be flowed through by refrigerant in accordance with demand in order to regulate the temperatures of the associated batteries. What is preferable here is on-off control, which can be realized in a particularly simple manner. For example, an upper threshold temperature ensures that the opening time of the respective valve device is increased to a certain extent, whereas a lower threshold temperature ensures that the opening time of the respective valve device is reduced again to a particular extent. For example, to increase the cooling action, the opening time may be doubled in relation to normal operation. More complex temperature regulation is likewise also conceivable. For example, various temperatures may be stored in a characteristic map, which temperatures are assigned suitable opening times for the respective valve device. The assignments may in this case vary from refrigerant path to refrigerant path or from refrigerant path group to refrigerant path group in order to allow for the respective boundary conditions of the individual refrigerant paths or refrigerant path groups. For example, the different refrigerant paths or refrigerant path groups may be of different lengths and/or may be assigned a different number of batteries and/or may comprise a different number of refrigerant paths.

In one advantageous embodiment, at least one refrigerant path may comprise multiple cooling elements which can be flowed through in series by the refrigerant or multiple cooling element sections which can be flowed through in series by the refrigerant. The heat transfer capacity or the cooling capacity of the individual refrigerant path can be correspondingly increased in this way.

A refinement is advantageous in which at least one refrigerant path comprises a single cooling element which comprises multiple refrigerant sections which can be flowed through in series by the refrigerant. In this way, within a single cooling element, multiple cooling element sections are provided which are flowed through in succession by the refrigerant.

In another embodiment, multiple or all cooling elements assigned to separate refrigerant paths may define a cooling element group which has at least one separate cooling element for each associated refrigerant path. In this case, the individual refrigerant paths are assigned complete cooling elements rather than cooling element sections.

In another advantageous embodiment, the respective valve devices may be arranged in the respective refrigerant path and/or in the respective refrigerant path group upstream of that cooling element or cooling element section which is flowed through by the refrigerant first or downstream of that cooling element or cooling element section which is flowed through by the refrigerant last. The construction of the individual refrigerant paths and/or of the respective refrigerant path groups is simplified in this way, as the associated valve device need merely be positioned upstream or downstream of the associated cooling elements and/or cooling element sections.

An embodiment is preferable in which each refrigerant path which does not belong to a refrigerant path group is assigned a separate valve device. In this way, it is possible in particular to realize two or more parallel refrigerant paths which can be flowed through independently of one another, in particular in succession, by refrigerant.

Alternatively or in addition, it may be provided in another embodiment that a refrigerant path group of said type is assigned precisely two refrigerant paths, wherein the refrigerant paths are then assigned a common valve device, specifically such that the respective valve device, in a first switching position, blocks the first refrigerant path of this refrigerant path group and opens the second refrigerant path of this refrigerant path group and, in a second switching position, opens the first refrigerant path and blocks the second refrigerant path. Thus, the respective valve device is assigned two refrigerant paths, whereby this embodiment can be realized at particularly low cost. In particular, the refrigeration circuit in this embodiment comprises only two refrigerant paths in total.

The method according to the invention for cooling batteries utilizes a refrigeration circuit which has cooling elements or cooling element sections coupled in heat-transmitting fashion to the batteries, wherein the cooling elements or cooling element sections are arranged so as to be distributed across multiple refrigerant paths which can be flowed through in parallel by the refrigerant. The method according to the invention is characterized in that multiple or all separate refrigerant paths are controlled individually with regard to their throughflow of the refrigerant. It is thus possible for the individual refrigerant paths to be flowed through by refrigerant in accordance with their present cooling demand, which optimizes the cooling of the respectively associated batteries and lengthens the service life thereof.

In particular, the method is carried out such that the individual control of the refrigerant paths with regard to their throughflow of refrigerant ultimately leads to a homogenous temperature distribution within the batteries assigned to the individual refrigerant paths.

In one advantageous embodiment, all separate refrigerant paths can be individually controlled with regard to their throughflow of refrigerant. Alternatively, at least two refrigerant paths may belong to a refrigerant path group, wherein the respective refrigerant path group is controlled individually with regard to its throughflow of refrigerant. The refrigerant paths associated with the refrigerant path group are in this case controlled in grouped fashion with regard to their throughflow of refrigerant.

In another advantageous refinement of the method, the separate refrigerant paths can be flowed through temporally in succession by the entire refrigerant flow flowing in the refrigeration circuit. Thus, the entire cooling power of the refrigeration circuit is temporarily available in full to each individual refrigerant path.

In another advantageous refinement, a time period during which the individual refrigerant paths are flowed through by the entire refrigerant flow can be selected individually for the individual refrigerant paths in a manner dependent on the present cooling demand of the respective refrigerant path. It is thus possible to realize flow through the individual refrigerant paths in accordance with demand.

Further important features and advantages of the invention will emerge from the subclaims, from the drawings and from the associated description of figures on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be explained in more detail in the following description, wherein identical or similar or functionally identical components are denoted by the same reference signs.

DETAILED DESCRIPTION

Figure 1:
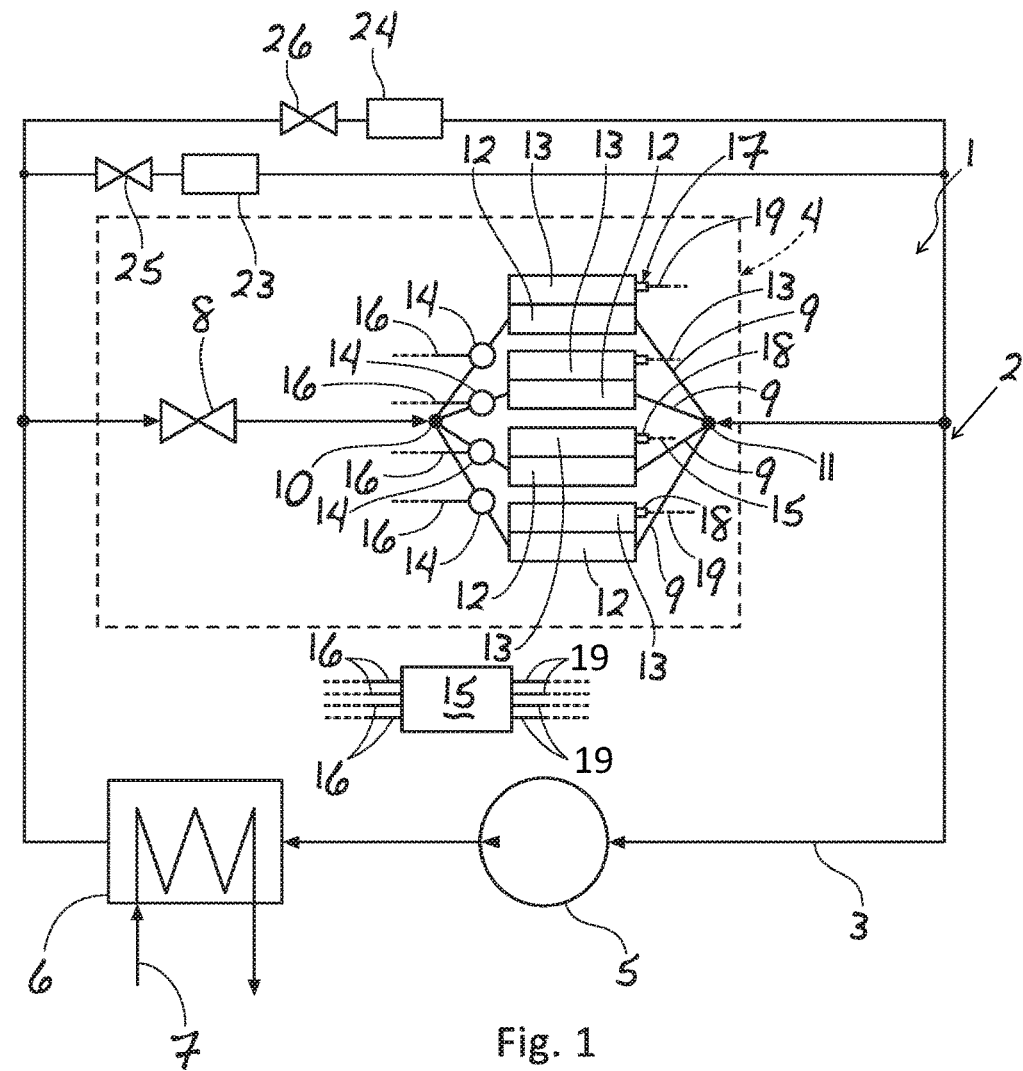
FIG. 1 is a greatly simplified diagrammatic illustration, in the form of a circuit diagram, of a battery cooling device with a cooling element arrangement arranged in a refrigeration circuit.

In accordance with FIG. 1, a battery cooling device 1, which is preferably used in a vehicle with electric drive (not shown here), comprises a refrigeration circuit 2 which has a refrigerant main line 3, into which there is incorporated a cooling element arrangement 4 which, in FIG. 1, is enclosed by a border with dashed lines. The refrigeration circuit 2 comprises, in its refrigerant main line 3, a compressor 5 for compressing the gaseous refrigerant which circulates in the refrigeration circuit 2 that is closed. Downstream of the compressor 5 there is provided a condenser 6 which is connected to a cooling circuit 7 and which extracts heat from the vaporous, compressed refrigerant, such that said refrigerant condenses. Arranged downstream of the condenser 6 there is an expansion device 8, which in this case forms part of the cooling element arrangement 4 and which is generally an expansion valve. The expansion device 8 is required firstly in order that the compressor 5 can generate the required pressure in the refrigerant. Secondly, the expansion device 8 effects an expansion of the cooled, pressurized and liquid refrigerant. The pressure reduction is associated with a temperature reduction, such that expanded, cooled and liquid refrigerant is present downstream of the expansion device 8.

As per FIG. 1, it is optionally possible for the refrigeration circuit 2 to be assigned, in parallel with the cooling element arrangement 4, a front-end evaporator 23 and/or a rear-end evaporator 24. The front-end evaporator 23 may be assigned to a front-end air-conditioning device of the respective vehicle, whereas the rear-end evaporator 24 may be assigned to a rear-end air-conditioning device of the respective vehicle. In the example of FIG. 1, the respective additional evaporator 23, 24 is in each case assigned a separate expansion valve 25 and 26 respectively.

Within the cooling element arrangement 4, the refrigeration circuit 2 furthermore comprises multiple refrigerant paths 9, which can be flowed through in parallel by the refrigerant. For this purpose, the refrigerant paths 9 branch off from the refrigerant main line 3 in a branching region 10. The refrigerant paths 9 are led back into the refrigerant main line 3 again in a confluence region 11. In the respective refrigerant path 9 there is arranged at least one cooling element 12 which can be flowed through by the refrigerant. In the example of FIG. 1, each refrigerant path 9 comprises precisely one cooling element 12, this however being merely an exemplary embodiment for simplifying the illustration. Furthermore, FIG. 1 shows precisely four refrigerant paths 9, again merely by way of example. Any other desired number is basically also conceivable here.

Corresponding to FIG. 1, the cooling elements 12 are each coupled in heat-transmitting fashion to at least one battery 13, such that heat generated in the batteries 13 can be absorbed by the cooling elements 12 and can be dissipated in the respective refrigerant path 9.

Figure 2:
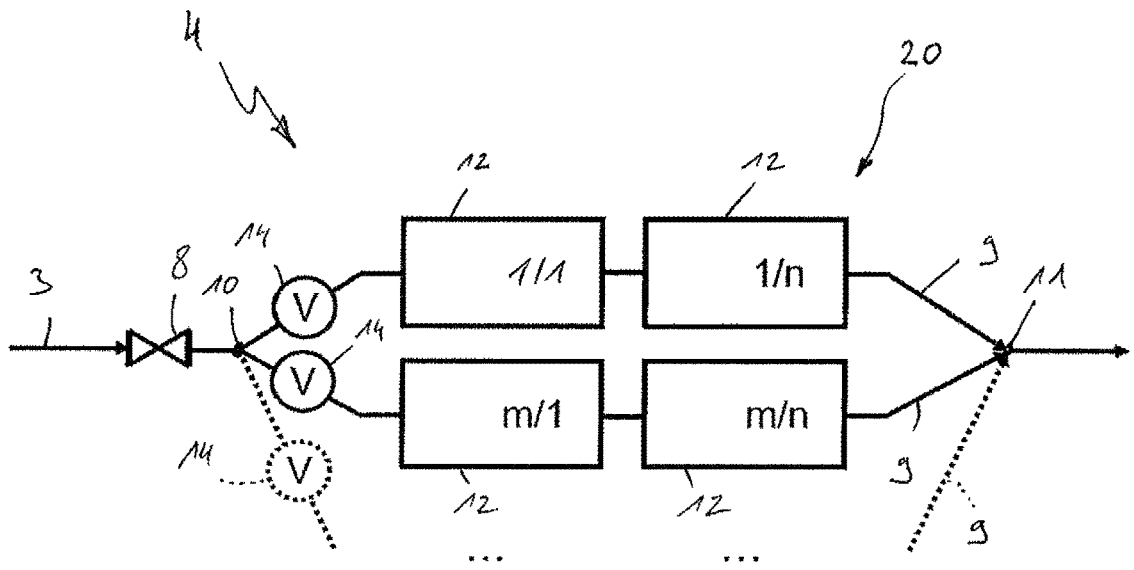
FIGS. 2-4 are greatly simplified diagrammatic illustrations of cooling element arrangements in different embodiments.
Figure 3:
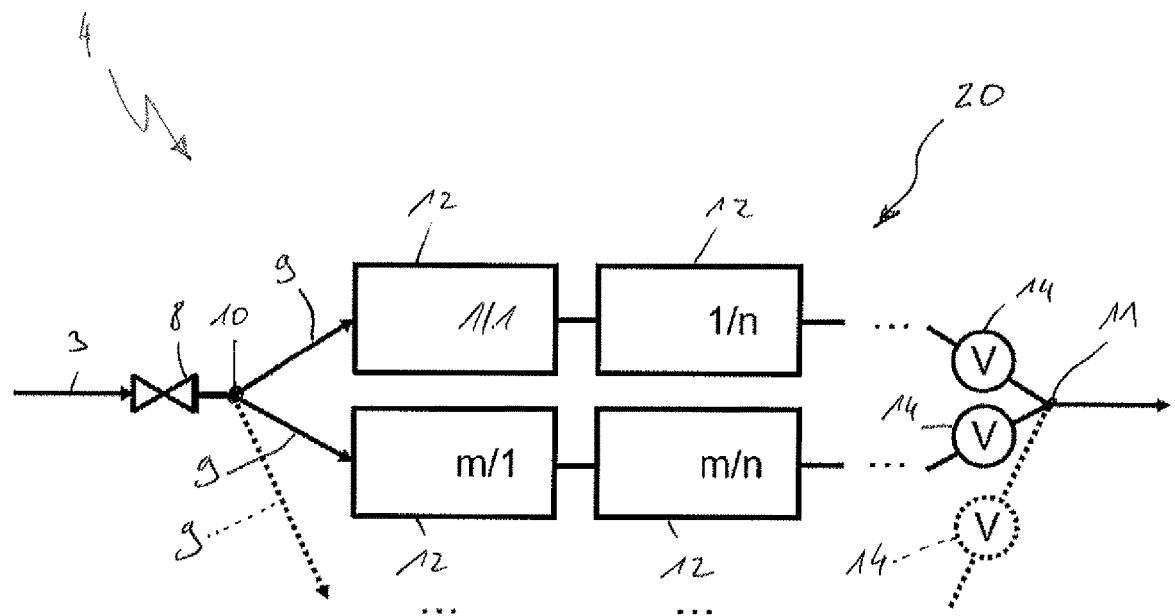
Figure 4:
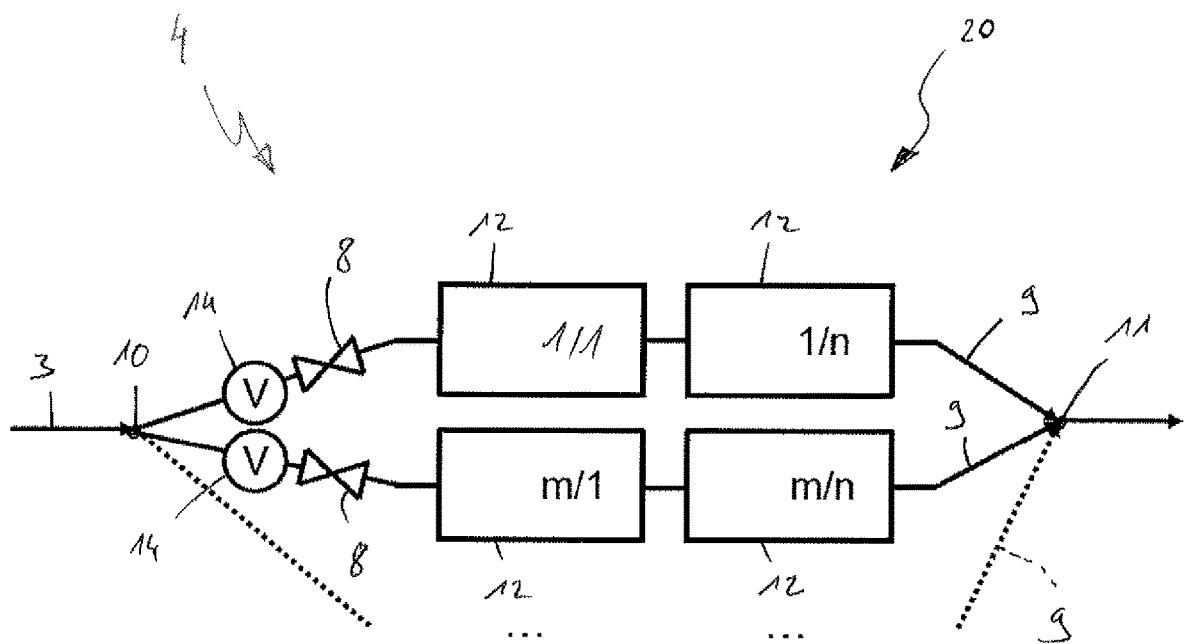

By way of example, FIGS. 2-4 show the possibility of providing a total of m refrigerant paths 9, wherein m is an integer ≥2. Comprised within the respective refrigerant path 9 there are n cooling elements 12, wherein n is an integer ≥2. It is basically also possible for only a single cooling element 12 to be contained within the respective refrigerant path 9. Furthermore, it is clear that a different number of cooling elements 12 may also be comprised within the individual refrigerant paths 9. Furthermore, it is also the case that the cooling elements 12 need not be of identical construction, although structurally identical cooling elements 12 are advantageous with regard to inexpensive manufacture. FIGS. 2-4 thus show, for the cooling elements 12, a matrix which has 1 to n columns and 1 to m rows.

The refrigerant paths 9 can be controlled with regard to their capacity for a throughflow of refrigerant. For this purpose, in FIGS. 1-4, each refrigerant path 9 is equipped with a valve device 14. In FIGS. 2-4, the respective valve device 14 is furthermore denoted by V. FIG. 1 also shows a control device 15 which is coupled to the valve devices 14 in a suitable manner. Corresponding control lines 16 are indicated by way of example. Furthermore, in FIG. 1, a temperature sensor arrangement 17 is provided which, in the example, comprises multiple temperature sensors 18 which are assigned to in each case one of the batteries 13 in order to detect the temperature thereof. The temperature sensor arrangement 17 or the individual temperature sensors 18 are coupled to the control device 15 in a suitable manner, for example by way of signal lines 19 which are indicated here. The control device 15 can thus realize temperature regulation of the individual refrigerant paths 9. For this purpose, the control device 15 can for example select the opening times of the valve devices 14 in a manner dependent on the determined temperatures. Higher temperatures signal a higher cooling demand in the respective refrigerant path 9. Accordingly, a higher temperature leads to a longer opening time at the associated valve device 14.

The control device 15 is configured so as to actuate the valve devices 14 such that the individual refrigerant paths 9 are in each case flowed through temporally in succession by the entire refrigerant flow flowing in the refrigerant main line 3. For this purpose, the control device 15 can successively actuate in each case only one of the valve devices 14 for opening, while simultaneously actuating all of the other valve devices 14 to close. After the predetermined opening time of the respective open valve device 14, said valve device is actuated to close, while at the same time the next valve device 14 is actuated to open.

As can be seen from FIGS. 2-4, the refrigerant paths 9 shown here each comprise multiple cooling elements 12 which are flowed through in series by the refrigerant. In the embodiments of FIGS. 2-4, the cooling elements 12 assigned to the separate refrigerant paths 9 define a cooling element group 20. The respective cooling element group 20 has at least one separate cooling element 12 for each associated refrigerant path 9.

In the embodiment shown in FIG. 2, the respective valve device 14 is arranged in the associated refrigerant path 9 upstream of the cooling element 12 through which flow passes first. Furthermore, the respective valve device 14 is situated downstream of the branching region 10. Furthermore, in this example, the expansion device 8 is arranged upstream of the branching region 10, that is to say in the refrigerant main line 3.

In the embodiment shown in FIG. 3, the valve devices 14 are arranged within the respective refrigerant path 9 downstream of the cooling element 12 through which flow passes last. Furthermore, the valve devices 14 are arranged upstream of the confluence region 11. The expansion device 8 is again arranged upstream of the branching region 10.

FIG. 4 then shows an embodiment in which, by contrast to FIGS. 1-3, a common expansion device 8 arranged in the refrigerant main line 3 is not provided, this being replaced by multiple separate expansion devices 8 which are each arranged in one of the refrigerant paths 9. In the example of FIG. 4, the expansion devices 8 are each situated in the respective refrigerant path 9 upstream of the cooling element 12 through which flow passes first, and merely by way of example, downstream of the associated valve device 14. It is also conceivable here for the valve devices 14 to be arranged downstream of the expansion devices 8, in particular downstream of the cooling element 12 through which flow passes last.

The cooling elements 12 within the respective refrigerant path 9 serve, within the refrigeration circuit 2, as evaporators or pre-evaporators for the refrigerant. During the evaporation of the refrigerant, the cooling elements 12 absorb a large amount of heat.

Figure 5A:
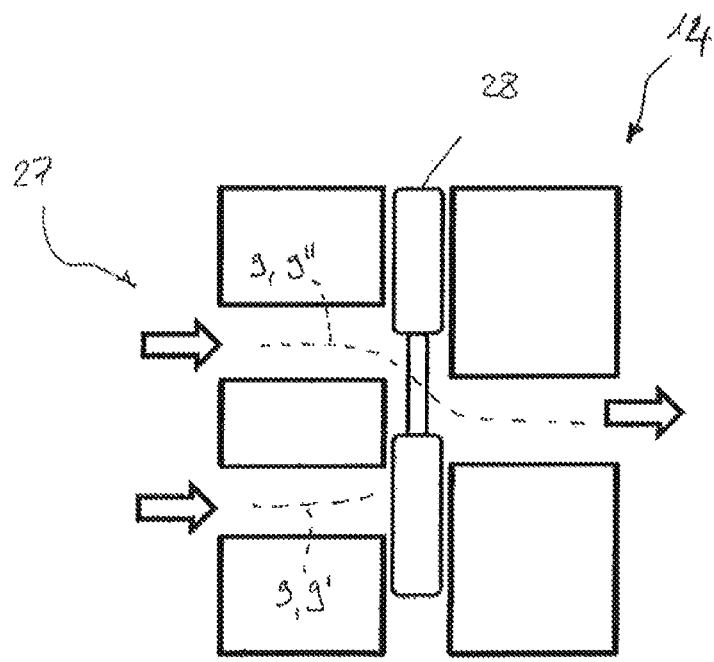
FIG. 5A is a greatly simplified diagrammatic illustration of a cooling element with integrated valve device in a first switching position according to an example.
Figure 5B:
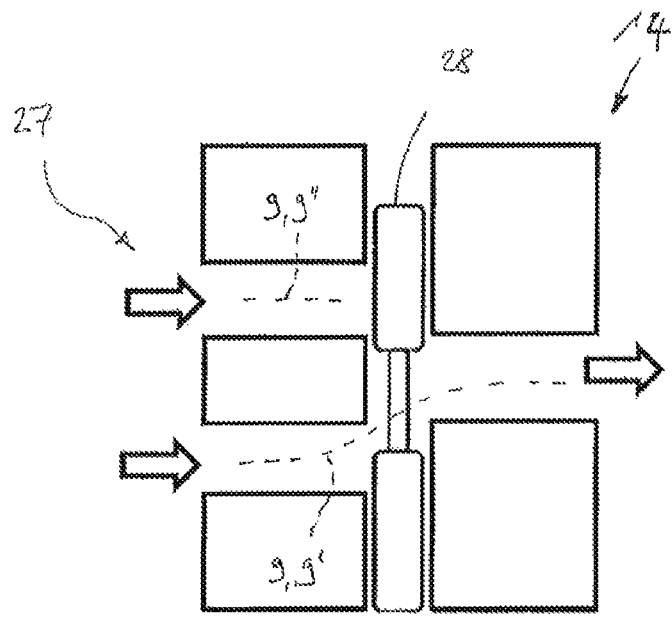
FIG. 5B illustrates a simplified diagrammatic illustration of the cooling element according to FIG. 5A with integrated valve device in a second switching position according to an example.

Whereas the embodiments shown in FIGS. 1-4 are based on separate valve devices 14 being arranged in the individual refrigerant paths 9, FIGS. 5a and 5b show an embodiment in which two refrigerant paths 9 are combined to form a refrigerant path group 27, wherein said refrigerant path group 27 is assigned only one valve device 14. Accordingly, in this case, precisely two refrigerant paths 9 are assigned a common valve device 14. One refrigerant path, or the first refrigerant path, is in this case denoted by 9', whereas the other refrigerant path, or the second refrigerant path, is denoted by 9". In FIGS. 5a and 5b, a valve element 28 of the valve device 14 is designed, by way of example, as a slide. The valve device 14 can, in a first switching position as per FIG. 5a, block the first refrigerant path 9' and open the second refrigerant path 9", such that in this case flow passes only through the second refrigerant path 9". As per FIG. 5b, the valve device 14 can then, in a second switching position, open the first refrigerant path 9' and block the second refrigerant path 9". As a result, all of the refrigerant flows only through the first refrigerant path 9'.

The battery cooling device 1 presented in FIGS. 1 to 5 can in particular be operated such that multiple or all separate refrigerant paths 9 and/or refrigerant path groups 27 are controlled individually with regard to their throughflow of refrigerant. This mode of operation, or an operating method of said type, can be realized through corresponding programming of the control unit 15. In particular, the individually controllable refrigerant paths 9 can be controlled in targeted fashion such that a homogenous temperature distribution is realized in the associated batteries 13. What is preferable is a mode of operation in which the separate refrigerant paths 9 and/or the refrigerant path groups 27 that may be provided are flowed through temporally in succession by the entire refrigerant flow flowing in the refrigeration circuit 2. For this purpose, the valve devices 14 are actuated to open in succession, such that, preferably, it is always the case that only one valve device 14 is open, whereas all of the other valve devices 14 are closed. Since these states are always present only temporarily, such that all of the refrigerant paths 9 are flowed through in succession, the individual valve devices 14 are actuated in cyclic fashion over time by the control device 15, such that this can also be referred to overall as cyclic operation. Suitable cycle frequencies or switching frequencies may in this case lie in a range from 0.001 Hz to 100 Hz. It is for example possible for the respective refrigerant path 9 and/or the refrigerant paths 9 combined to form a group 27 to each be flowed through by the refrigerant flow for approximately 1 s and then blocked again until the next cycle. If the batteries 13 assigned to the different refrigerant paths 9 generate different temperatures, it is also possible for the individual refrigerant paths 9 and/or refrigerant path groups 27 to be individually flowed through by refrigerant in accordance with the respectively present cooling demand. It is preferably the case here that a time period during which the individual refrigerant paths 9 are flowed through by the entire refrigerant flow is selected individually for the individual refrigerant paths 9 in a manner dependent on the present cooling demand of the respective refrigerant path 9. In particular, it is possible in this way to realize individual temperature regulation of the individual refrigerant paths 9.

It is clear that separately controllable refrigerant paths 9 may also be implemented in combination with at least one refrigerant path group 27. The respective refrigerant path group 27 is then treated as a separate refrigerant path 9 by the respective controller.

The invention claimed is:

1. A battery cooling device, comprising:
a refrigeration circuit to communicate a refrigerant in a flow direction, the refrigeration circuit including a plurality of refrigerant paths to be flowed through in parallel by the refrigerant along the flow direction,
wherein the plurality of refrigerant paths is in an annular arrangement, each of the plurality of refrigerant paths having at least one cooling element of a plurality of cooling elements and at least one valve device of a plurality of valve devices, wherein the plurality of cooling elements is downstream of a compressor and an expansion device,
wherein the plurality of cooling elements is fluidically incorporated into respective ones of the plurality of refrigerant paths, and thermally coupled in a heat-transmitting manner to at least one battery,
wherein the plurality of valve devices is configured to control a throughflow of the refrigerant by successively actuating to an open position a refrigerant path group defined by at least two refrigerant paths while actuating other ones of the plurality of refrigerant paths to a closed position, and
wherein the plurality of valve devices is arranged in the respective ones of the plurality of refrigerant paths downstream of a branching region with respect to the flow direction, the branching region defined by the refrigerant path group branching from a refrigerant main line of the refrigeration circuit, and wherein the plurality of valve devices is arranged upstream of a confluence region with respect to the flow direction, the confluence region defined by the refrigerant path group connecting to the refrigerant main line.

2. The battery cooling device according to claim 1, wherein at least one of:
the respective ones of the plurality of refrigerant paths of the refrigerant path group are each controllable individually with regard to the throughflow of refrigerant via a separate valve device of the plurality of valve devices,
the respective ones of the plurality of refrigerant paths of the refrigerant path group are controllable with regard to the throughflow of refrigerant via a common valve device of the plurality of valve devices, and
the respective ones of the plurality of refrigerant paths of the refrigerant path group are controllable individually with regard to the throughflow of refrigerant via the common valve device of the plurality of valve devices.

3. The battery cooling device according to claim 1, wherein the respective ones of the plurality of valve devices include an open-closed valve switchable between an open position and a closed position.

4. The battery cooling device according to claim 1, further comprising a control device operatively coupled to the plurality of valve devices for actuating the plurality of valve devices, wherein the control device actuates the plurality of valve devices successively such that the at least two refrigerant paths of the refrigerant path group are flowed through temporally in succession by the refrigerant flowing in the refrigerant main line.

5. The battery cooling device according to claim 4, wherein the control device successively actuates only one of the plurality of valve devices to an open position to allow the throughflow of refrigerant, wherein the other of the plurality of valve devices are in a closed position, and wherein the actuating of the other ones of the plurality of refrigerant paths includes actuating all other ones of the plurality of refrigerant paths to the closed position.

6. The battery cooling device according to claim 4, further comprising:

a temperature sensor arrangement to determine a temperature of the at least one battery, the temperature sensor arrangement being coupled to the control device, wherein the control device actuates respective ones of the plurality of valve devices to an open position for a predetermined opening time in response to the temperature of the at least one battery, wherein a duration of the predetermined opening time increases as the temperature of the at least one battery exceeds a predetermined temperature.

7. The battery cooling device according to claim 6, wherein the control device regulates the temperature of the at least one battery via varying the predetermined opening times of the respective ones of the plurality of valve devices.

8. The battery cooling device according to claim 1, wherein at least one refrigerant path includes at least one of:

the cooling element including a plurality of cooling elements, each to be flowed through in series by the refrigerant, and the at least one section including a plurality of sections, each to be flowed through in series by the refrigerant.

9. The battery cooling device according to claim 1, wherein the at least one section of the cooling element includes two sections to be flowed through in series by the refrigerant.

10. The battery cooling device according to claim 1, wherein each of the plurality of cooling elements is in the respective ones of the plurality of refrigerant paths to define a cooling element group, wherein the cooling element group includes at least one separate cooling element of the plurality of cooling elements for each associated one of the plurality of refrigerant paths.

11. The battery cooling device according to claim 1, wherein at least one of:

at least one of the plurality of valve devices is arranged upstream of the at least one section of the cooling element of an associated one of the plurality of refrigerant paths; and at least one of the plurality of valve devices is arranged downstream of the at least one section of the cooling element of the associated one of the plurality of refrigerant paths.

12. The battery cooling device according to claim 1, wherein at least one of:

each of the respective ones of the plurality of refrigerant paths not incorporated into the refrigerant path group is associated with a separate valve device of the plurality of valve devices, and the refrigerant path group includes two refrigerant paths and is associated with one valve device, wherein the valve device associated with the refrigerant path group is switchable between a first switching position and a second switching position, wherein the first switching position blocks a first refrigerant path of the refrigerant path group and opens a second refrigerant path of the refrigerant path group, and the second switching position opens the first refrigerant path and blocks the second refrigerant path.

13. A method for cooling a battery device, comprising:

communicating a refrigerant in a flow direction via a refrigeration circuit, the refrigeration circuit including a plurality of refrigerant paths each associated with a cooling element arrangement having at least one section of a cooling element, wherein the at least one section of the cooling element is respectively coupled in a heat-transmitting manner to at least one battery, arranging the at least one section of the cooling element associated with each of the plurality of refrigerant paths in parallel with respect to the flow direction to be flowed through by the refrigerant, and distributing the refrigerant to the plurality of refrigerant paths by successively actuating a plurality of valve devices associated with the respective ones of the plurality of refrigerant paths to communicate the refrigerant through at least two of the plurality of refrigerant paths in succession in an open position while actuating other ones of the plurality of refrigerant paths to a closed position, wherein distributing the refrigerant includes controlling a throughflow of the refrigerant of the at least two of the plurality of refrigerant paths collectively.

14. The method according to claim 13, wherein the at least two of the plurality of refrigerant paths define a refrigerant path group in an annular arrangement, and the method further comprising controlling the throughflow of refrigerant of the refrigerant path group individually.

15. The method according to claim 14, wherein distributing the refrigerant further includes conveying the refrigerant for a predetermined time period successively to respective ones of the refrigerant path group.

16. The method according to claim 15, wherein the predetermined time period is determined individually for the refrigerant path group in response to a present cooling demand thereof.

17. The battery cooling device according to claim 2, wherein at least one refrigerant path includes at least one of:

the cooling element including a plurality of cooling elements, each to be flowed through in series by the refrigerant; and the at least one section including a plurality of sections, each to be flowed through in series by the refrigerant.

18. The battery cooling device according to claim 2, wherein at least one of the plurality of refrigerant path includes the cooling element having at least two sections each to be flowed through in series by the refrigerant.

19. The battery cooling device according to claim 3, wherein the plurality of valve devices are switched in the open position successively, wherein one of the plurality of valve devices is in the open position and the other valve devices of the plurality of valves are in the closed position.

20. A battery cooling device, comprising:

a refrigeration circuit including a main line to communicate a refrigerant in a flow direction, the main line including a plurality of refrigerant paths defined between a branching region, in which the plurality of refrigerant paths branch away from the main line, and a confluence region in which the plurality of refrigerant paths connect with the main line, wherein the plurality of refrigerant paths is fluidically separated and to be flowed through in parallel by the refrigerant along the flow direction;

a plurality of cooling elements associated with the plurality of refrigerant paths in an annular arrangement, the plurality of cooling elements being fluidically incorporated into the plurality of refrigerant paths and to be flowed through by the refrigerant, wherein the plurality of cooling elements are thermally coupled in a heat-transmitting manner to at least one battery; and a plurality of valve devices in the respective ones of the plurality of refrigerant paths, the plurality of valve devices being configured to control a throughflow of the refrigerant in the plurality of refrigerant paths by successively actuating the plurality of valve devices to communicate the refrigerant through at least two of the plurality of refrigerant paths in succession, the plurality of valve devices being arranged downstream the branching region and upstream the confluence region with respect to the flow direction, wherein the plurality of valve devices are switchable to an opened position permitting the throughflow of the refrigerant through the at least two of the plurality of refrigerant paths while other ones of the plurality of refrigerant flow paths are in a closed position blocking the throughflow of the refrigerant.

* * * * *